United States Patent
Toneu et al.

(10) Patent No.: US 10,654,214 B2
(45) Date of Patent: May 19, 2020

(54) TRIM PARTS FORMING METHOD AND TOOLS

(71) Applicant: FAURECIA INTERIEUR INDUSTRIE, Nanterre (FR)

(72) Inventors: Xavier Toneu, Gandia (ES); Maxime Salandre, Rochester Hills, MI (US); Angel Solera, Valencia (ES)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 655 days.

(21) Appl. No.: 15/167,504

(22) Filed: May 27, 2016

(65) Prior Publication Data

US 2016/0346989 A1    Dec. 1, 2016

(30) Foreign Application Priority Data

May 28, 2015    (EP) .................................. 15305813.6

(51) Int. Cl.
| | | |
|---|---|---|
| *B29C 51/08* | (2006.01) | |
| *B29C 51/30* | (2006.01) | |
| *B29C 33/30* | (2006.01) | |
| B29K 23/00 | (2006.01) | |
| B29K 105/04 | (2006.01) | |
| B29K 105/00 | (2006.01) | |
| B29L 31/30 | (2006.01) | |

(Continued)

(52) U.S. Cl.
CPC .......... *B29C 51/087* (2013.01); *B29C 33/308* (2013.01); *B29K 2023/12* (2013.01); *B29K 2105/04* (2013.01); *B29K 2105/12* (2013.01); *B29K 2105/256* (2013.01); *B29K 2311/10* (2013.01); *B29L 2031/3041* (2013.01)

(58) Field of Classification Search
CPC . B29C 51/087; B29C 33/308; B29K 2105/12; B29K 2311/10; B29K 2105/256; B29K 2105/04; B29K 2023/12; B29L 2031/3041
See application file for complete search history.

(56) References Cited

U.S. PATENT DOCUMENTS

| 5,512,221 A | 4/1996 | Maus et al. |
| 7,005,103 B2 | 2/2006 | Smith et al. |
| 2004/0229013 A1 | 11/2004 | Dooley et al. |

(Continued)

FOREIGN PATENT DOCUMENTS

| WO | WO0126879 A1 | 4/2001 |
| WO | WO2011061346 A1 | 5/2011 |

OTHER PUBLICATIONS

Extended European Search Report corresponding to application No. EP15305813, dated Nov. 16, 2015, 11 pages.

*Primary Examiner* — Robert J Grun
(74) *Attorney, Agent, or Firm* — Reising Ethington P.C.

(57) ABSTRACT

A method for manufacturing first and second trim parts of a vehicle, the first trim part having a first thickness and the second trim part having a second thickness different from the first thickness. The method includes introducing the first trim part and the second trim part between a front and a back tool of the forming mold, the front tool having a front fixed part and a front movable insert movable with respect to the front fixed part along a main direction, the back tool having a back fixed part and a back movable insert movable with respect to the back fixed part along the main direction; and adjusting settings of the forming mold to different values for the first and second trim parts.

13 Claims, 5 Drawing Sheets

(51) Int. Cl.
　　　*B29K 105/12*　　　(2006.01)
　　　*B29K 311/10*　　　(2006.01)

(56) References Cited

U.S. PATENT DOCUMENTS

2006/0231981  A1    11/2006   Lee et al.
2012/0286447  A1    11/2012   Horeth et al.

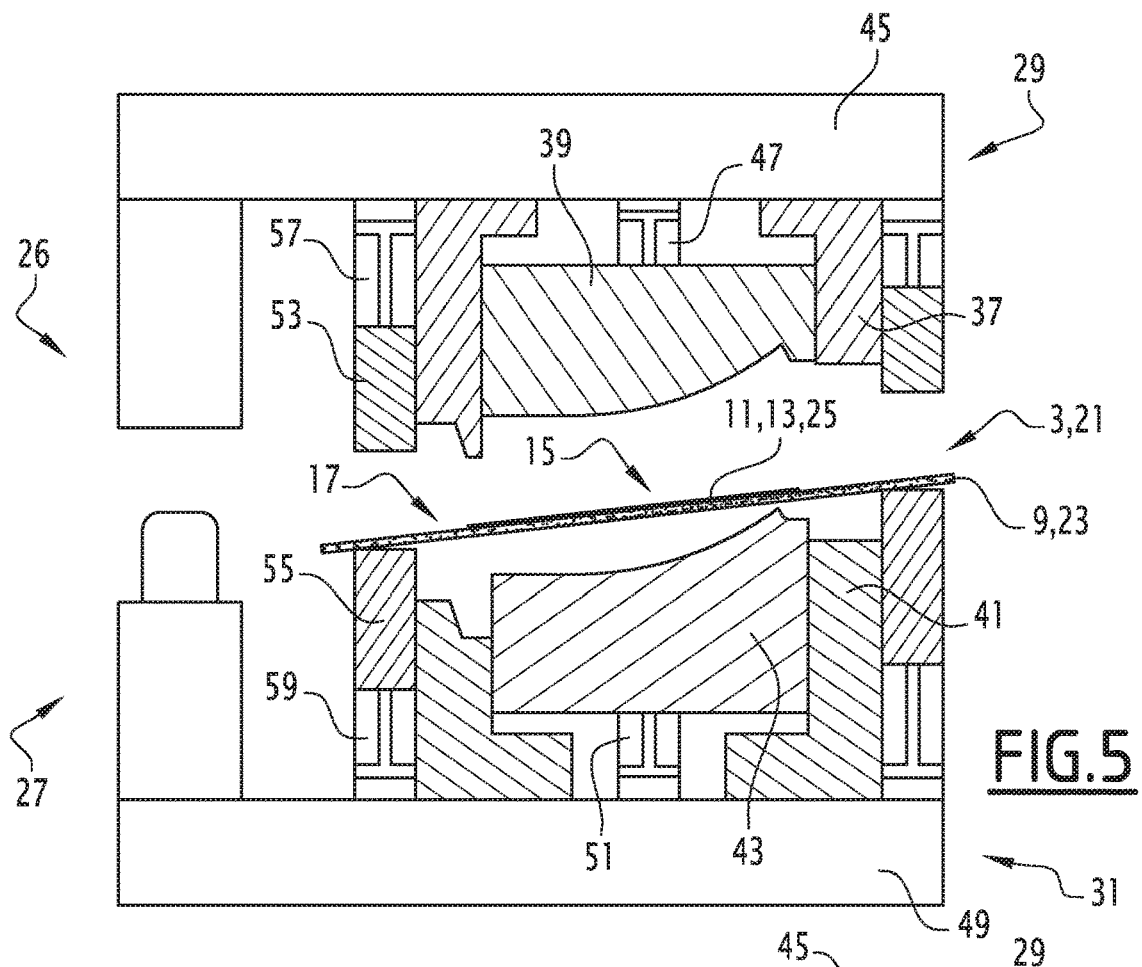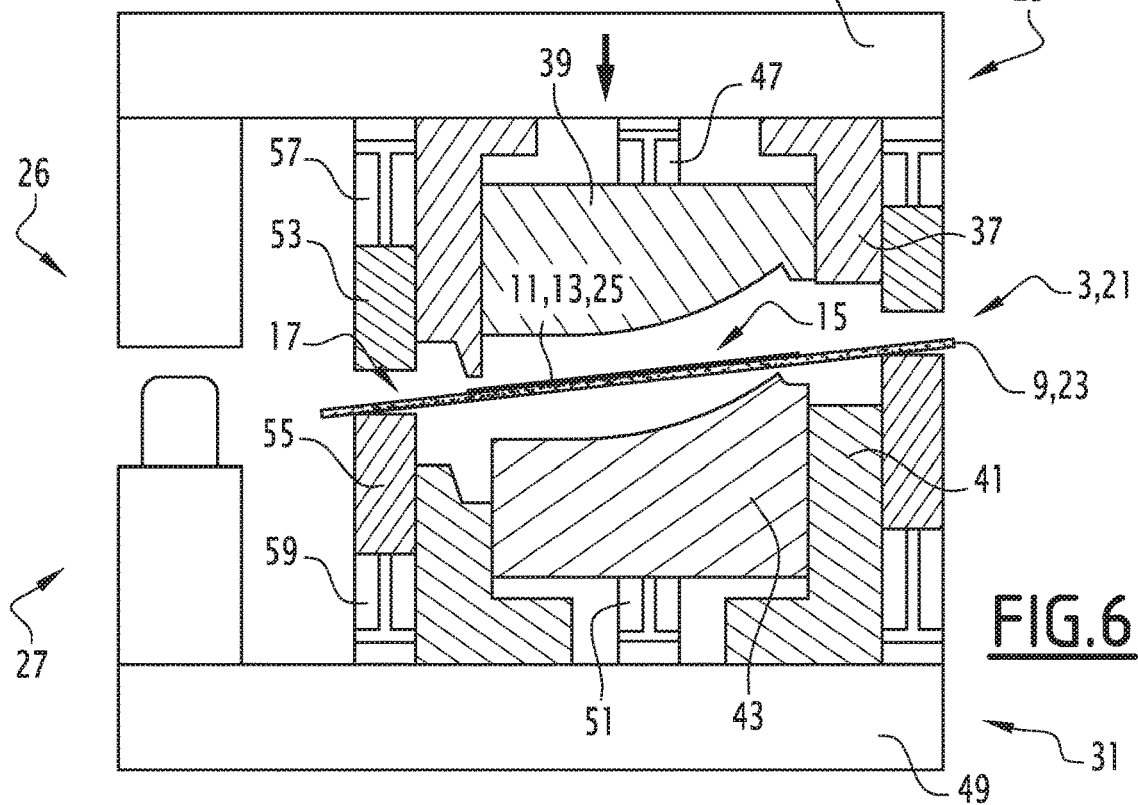

TRIM PARTS FORMING METHOD AND TOOLS

TECHNICAL FIELD

The invention relates to forming methods and tools for trim parts of vehicles.

BACKGROUND

More specifically, the invention according to a first aspect concerns a method for manufacturing first and second trim parts of vehicles, the first trim part having a first thickness and the second trim part having a second thickness different from the first thickness.

Indeed, car manufacturers usually propose, for the same type of car, regular trim parts and premium trim parts, with different coverings or finishes. The regular trim part for example comprises a NFPP layer (Natural Fiber Poly Propylene), covered by a thin decorated layer. The premium trim part comprises a foam layer between the decoration layer and the NFPP layer.

The decoration layer defines the visible surface, or A-surface, while the NFPP layer defines the non-visible surface, or B-surface. The regular and premium trim parts must be integrated in the same interior equipment. They must fit in the interior equipment, with no visible gap between the trim part and the surrounding parts.

It is possible to produce the first and second trim parts in different forming molds. However, it is necessary in this case to buy two different molds, and the investment cost as a consequence is high.

SUMMARY

An aim of the invention is thus to provide a method according to which the same mold can be used for manufacturing different trim parts having different thicknesses, and especially used for manufacturing a first trim part that has a compressible layer such as a foam layer, and a second trim part that does not have the compressible layer.

According to an aspect of the invention, the method comprises the following steps:

adjusting settings of a forming mold to first values;

introducing the first trim part between a front and a back tool of the forming mold, the front tool having a front fixed part and a front movable insert movable with respect to the front fixed part along a main direction, the back tool having a back fixed part and a back movable insert movable with respect to the back fixed part along the main direction;

closing the forming mold, the first values of the settings being chosen such that, when the forming mold is closed, the front insert has a first front final position along the main direction with respect to the front fixed part and the back insert has a first back final position along the main direction with respect to the back fixed part;

adjusting settings of the forming mold to second values different from the first values;

introducing the second trim part between front and back tools of the forming mold;

closing the forming mold, the second values of the settings being chosen such that, when the forming mold is closed, the front insert has a second front final position along the main direction with respect to the front fixed part different from the first front final position, and the back insert has a second back final position along the main direction with respect to the back fixed part, different from the first back final position.

Since the front and back inserts final positions can be adjusted by changing the settings of the mold, trim parts having different thicknesses can be formed in the same mold.

Moreover, and as explained in a more detailed manner below, the method allows producing in the same mold a first trim part with a foam layer and a second trim part without a foam layer. The front insert final position is adjusted taking into account the final expansion of the compressible layer, for the first trim part with a compressible layer. The back insert final position is adjusted as a function of the thickness of the trim part.

The method may include as well the following features, considered alone or according to any technically feasible combination:

the settings comprise the front final position of the front insert along the main direction with respect to the front fixed part and the gap between the front insert and the back insert when the forming mold is closed;

the front and back tools are moved one toward the other when the forming mold closes, the first trim part having a non-compressible layer toward the back tool and a compressible layer toward the front tool, the second trim part having no compressible layer and the second thickness being lower than the first thickness, the second front final position being shifted away from the back tool along the main direction with respect to the first front final position, the second back final position being shifted toward the front tool along the main direction with respect to the first back final position;

the front tool defines the A-side of the first and second trim parts;

central areas of the first and second trim parts are formed between the front and back inserts, and surrounding areas of the first and second trim parts are formed between the front and back fixed parts, the respective surrounding areas of the first and second trim parts surrounding the respective central areas of the first and second trim parts;

the step of closing the forming mold comprises the following sub-steps:

moving the front and back tools toward one another, until the central area of the first or second trim part is pressed by the front insert against the back insert, the surrounding area of the first or second trim part being not pressed by the front fixed part against the back fixed part; and moving the front and back tools further toward one another, the back insert being moved with the front insert with respect to the back fixed part along the main direction, until the surrounding area of the first or second trim part is pressed by the front fixed part against the back fixed part.

According to a second aspect of the invention, there is provided an assembly for manufacturing first and second trim parts of vehicles, the first trim part having a first thickness and the second trim part having a second thickness different from the first thickness, the assembly comprising:

a forming mold, having front and back tools movable with respect to one another, the front tool having a front fixed part and an front movable insert movable with respect to the front fixed part along a main direction, the back tool having a back fixed part and a back movable insert movable with respect to the back fixed part along the main direction, the forming mold having an open position in which the front and back tools are farther away from one another, and a closed position in which the front and back tools are closer to one another;

a device for introducing the first or second trim parts between front and back tools of the forming mold in the open position;

a device adjusting settings of the forming mold selectively to first or second values different from one another, the first values of the settings being chosen such that, when the forming mold is closed, the front insert has a first front final position along the main direction with respect to the front fixed part and the back insert has a first back final position along the main direction with respect to the back fixed part, the second values of the settings being chosen such that, when the forming mold is closed, the front insert has a second front final position along the main direction with respect to the front fixed part different from the first front final position, and the back insert has a second back final position along the main direction with respect to the back fixed part, different from the first back final position.

The assembly may include as well the following features, considered alone or according to any technically feasible combination:

the settings comprise the front final position of the front insert along the main direction with respect to the front fixed part, and the gap between the front insert and the back insert when the forming mold is closed;

the first trim part has a non-compressible layer toward the back tool and a compressible layer toward the front tool, the second trim part having no compressible layer and the second thickness being lower than the first thickness, the second front final position being shifted away from the back tool along the main direction with respect to the first front final position, the second back final position being shifted toward the front tool along the main direction with respect to the first back final position;

the front tool defines the A-side of the first and second trim parts;

central areas of the first and second trim parts are formed between the front and back inserts, and peripheral areas of the first and second trim part are formed between the front and back fixed parts, the respective peripheral areas of the first and second trim parts surrounding the respective central areas of the first and second trim parts;

the forming mold is arranged such that, when the forming mold is closed by moving the front and back tools toward one another:

the central area of the first or second trim part is first pressed by the front insert against the back insert, the peripheral area of the first or second trim part being not pressed by the front fixed part against the back fixed part; and then the back insert is moved with the front insert with respect to the back fixed part along the main direction, until the peripheral area of the first or second trim part is pressed by the front fixed part against the back fixed part.

BRIEF DESCRIPTION OF THE DRAWINGS

Other features and advantages of the invention will become apparent from the following detailed description of a non-limitative embodiment, made in respect of the following figures:

FIGS. 5 to 8 are cross sections showing the mold at various intermediate positions and in the closed position.

DETAILED DESCRIPTION OF THE ILLUSTRATED EMBODIMENTS

Figure 1:
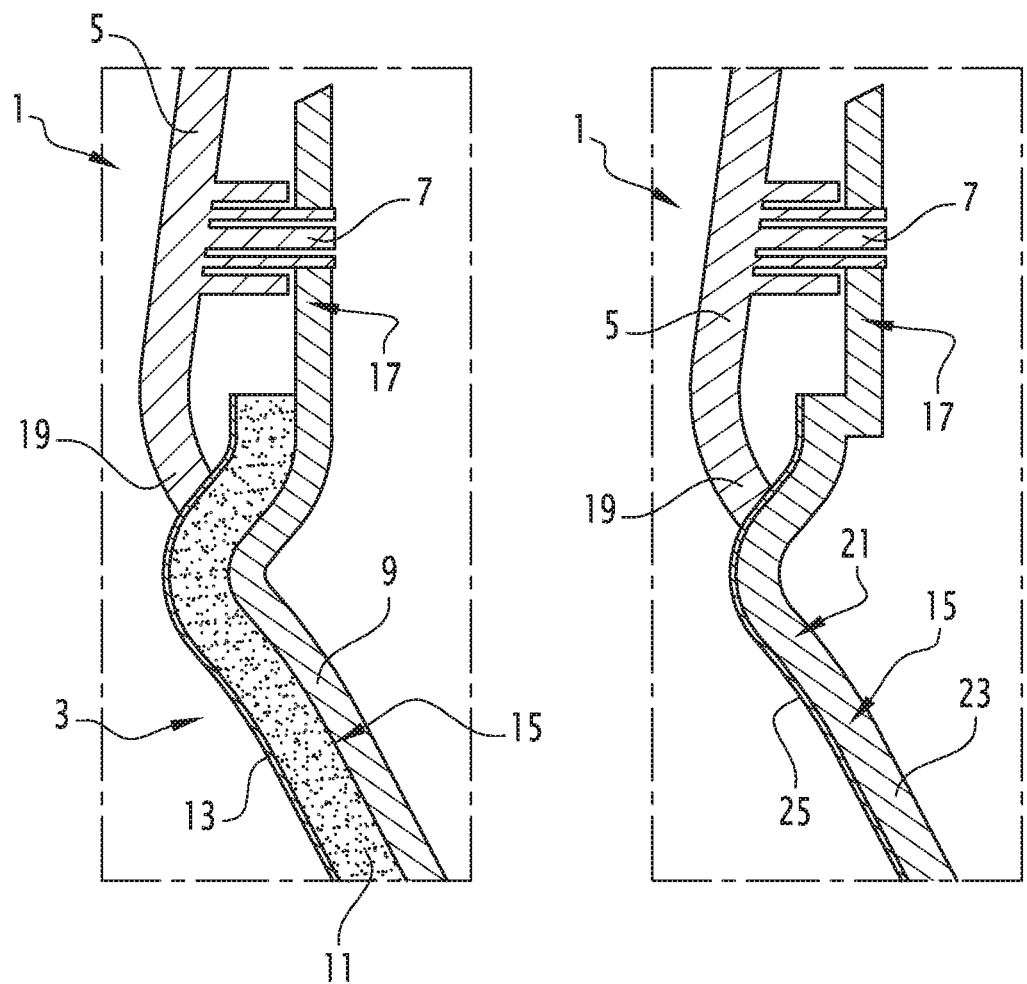
FIG. 1 is a cross section of an interior equipment of a vehicle, equipped with a first trim part with a compressible layer on the left side, and equipped with a second trim part without a compressible layer in the right.

FIG. 1 shows a cross section of an interior equipment 1 of a vehicle. The interior equipment is for example a door panel, a dashboard or any other equipment. The vehicle is typically an automobile or a truck.

The interior equipment shown on the left side of FIG. 1 comprises a first trim part 3, and another part 5 to which the first trim part 3 is secured, for example by mean of one or several clips 7, welding points or any suitable fixing means.

The first trim part 3 comprises a non-compressible layer 9, and a compressible layer 11. The compressible layer 11 is typically covered by a decorative layer 13. The first trim part may also include one or several other layers. The first trim part has a first thickness.

The non-compressible layer 9 is for example a NFPP layer (Natural Fiber Poly Propylene). In another embodiment, the non-compressible layer is in a plastic material, or in any other material. Non compressible layer is understood here as meaning rigid or semi-rigid material which may be formed, with in some case a slight thickness reduction, during a forming operation but which do not expand after the forming operation.

The compressible layer 11 is typically a foam layer or a 3D textile layer.

The first trim part 3 comprises a central area 15, where the non-compressible layer 9 is covered by the compressible layer 11, and a surrounding area 17, where the non-compressible layer 9 is not covered by the compressible layer 11.

The other part 5 is fixed directly to the surrounding area 17. As shown on the FIG. 1, the surrounding area 17 is hidden behind the other part 5. Most of the central area 15 is not located behind the other part 5 and is visible.

More precisely, the clips 7 are directly connected to the surrounding area 17.

The other part 5 has an edge 19, which bears against the decorative layer 13. There is no gap between the decorative layer 13 and the edge 19.

The decorative layer 13 defines the visible side of the trim part (A-surface) and the non-compressible layer 9 defines the non-visible side of the trim part (B-surface).

The FIG. 1 shows on the right side the same interior equipment 1, equipped with a second trim part 21. The second trim part 21 does not comprise a compressible layer. It has a second thickness, which is lower than the first thickness.

The second trim part comprises a non-compressible layer 23. Typically, it comprises a decorative layer 25, covering the non-compressible layer 23. The non-compressible layer 23 is a NFPP layer, or a plastic layer, or is in any other adapted material.

Typically, in the surrounding area 17 of the second trim part 21, the decorative layer 23 does not cover the non-compressible layer 23.

Again, the other part 5 is fixed directly to the surrounding area 17. The surrounding area 17 is hidden behind the other part 5, whereas the greatest part of the central area 15 is not located behind the other part 5.

The clips 7 are connected to the surrounding area 17.

The edge 19 bears against the decorative layer 23, with no gap between the decorative layer 23 and the edge 19.

The A-surfaces of the first and second trim parts 3, 21 are exactly at the same position, such that there is no gap, even though the first and second trim parts 3, 21 do not have the same thickness. The surrounding areas 17 of the first and second trim parts, or at least the zones of the surrounding areas to which the other part 5 is fixed, are at the same positions. In other words, in the first and in the second trim parts 3, 21, the A-surfaces have exactly the same position with respect to the zones of the non-compressible layer 9, 21 to which the other part 5 is fixed.

Figure 2:
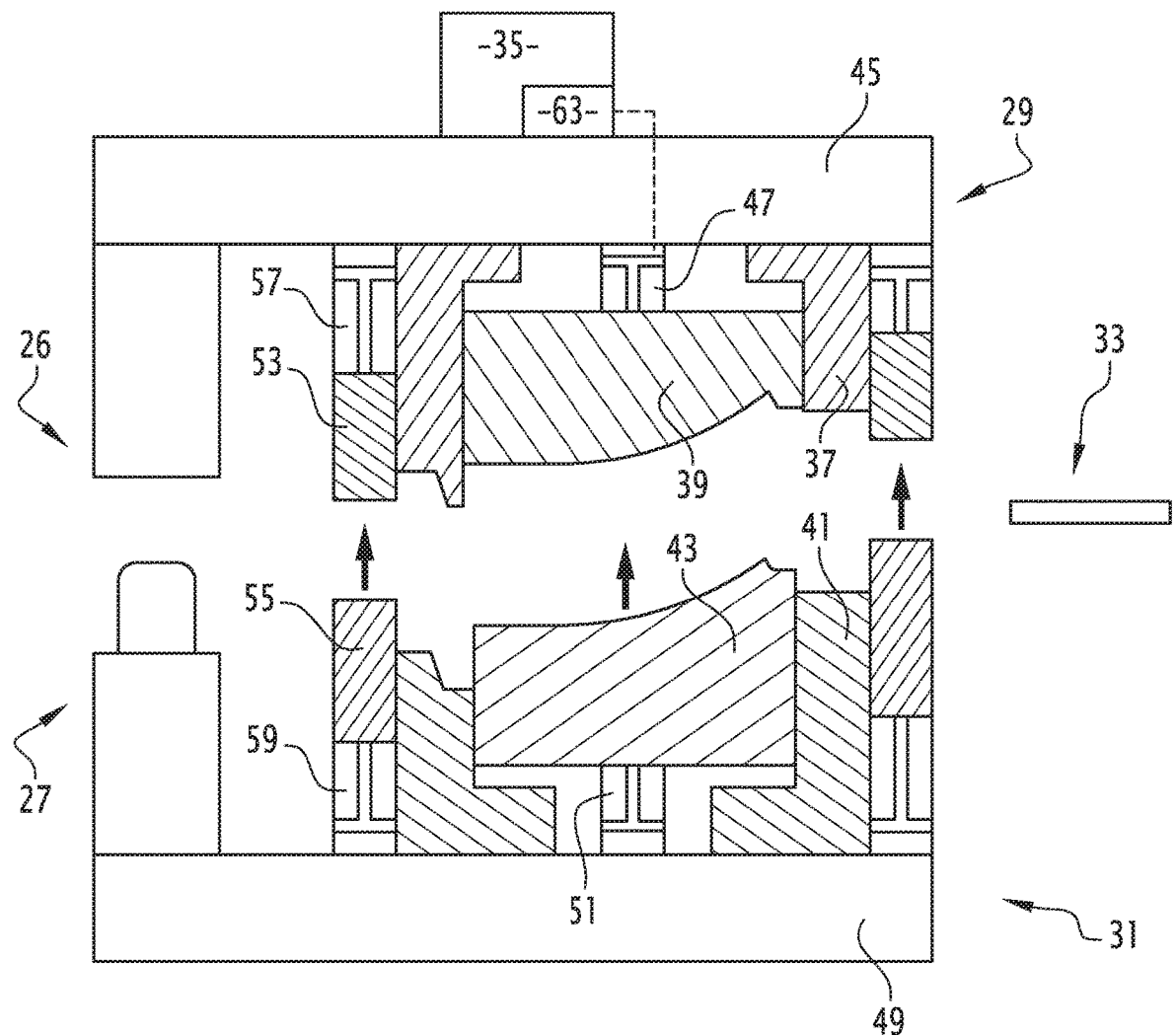
FIG. 2 is a cross section of the mold in its open position.

The first and second trim parts 3, 21 may be manufactured using the assembly 26 depicted on the FIG. 2.

The assembly 26 comprises:

a forming mold 27, having front and back tools 29, 31 movable with respect to one another, the mold 27 having an open position in which the front and back tools 29, 31 are farther away from one another, and a closed position in which the front and back tools 29, 31 are closer to one another and define a forming cavity between them;

a device 33 for introducing the first or second trim parts 3, 21 between front and back tools 29, 31 of the forming mold 27 in the open position; and a device 35 adjusting settings of the forming mold 27 selectively at least to first or second values different from one another.

The front tool 29 has a front fixed part 37 and a front movable insert 39 movable with respect to the front fixed part 37 along a main direction.

The back tool 31 has a back fixed part 41 and a back movable insert 43 movable with respect to the back fixed part 41 along the main direction.

The front fixed part 37 and the front insert 39 are mounted to a front frame 45. The front fixed part 37 is rigidly secured to the front frame 45. The front tool 29 includes an actuator 47, for example a cylinder, connecting the front insert 39 to the front frame 45.

The back fixed part 41 and the back insert 43 are mounted as well to a back frame 49. The back fixed part 41 is rigidly secured to the back frame 49. The back tool 31 includes an actuator 51, for example a cylinder, or a spring, connecting the back insert 43 to the back frame 49.

The front and back tools 29, 31 are typically moved with respect to one another along the main direction to open or close the mold 27.

The front and back fixed parts 37, 41 form between them the surrounding area 17 of the first and second trim parts 3, 21. The front and back inserts 39, 43 form between them the central area 15 of the first and second trim parts 3, 21.

The device 33 for introducing the first or second trim parts 3, 21 in the forming mold 27 is typically a movable frame, equipped with means for clamping the first or second trim parts 3, 21.

The assembly 26 further includes front and back clamps 53, 55 for clamping the first or second trim parts 3, 21 after it is introduced into the mold 27. The front clamp 53 is mounted on the front tool 29 and is moved with the front tool. It is for example connected to the front frame by an actuator 57, for example a cylinder, so that its position along the main direction with respect to the front frame is adjustable selectively. The back clamp 55 is mounted on the back tool 31. It is for example connected to the back frame 49 by an actuator 59, for example a cylinder, so that its position along the main direction with respect to the back frame is adjustable.

Figure 3:
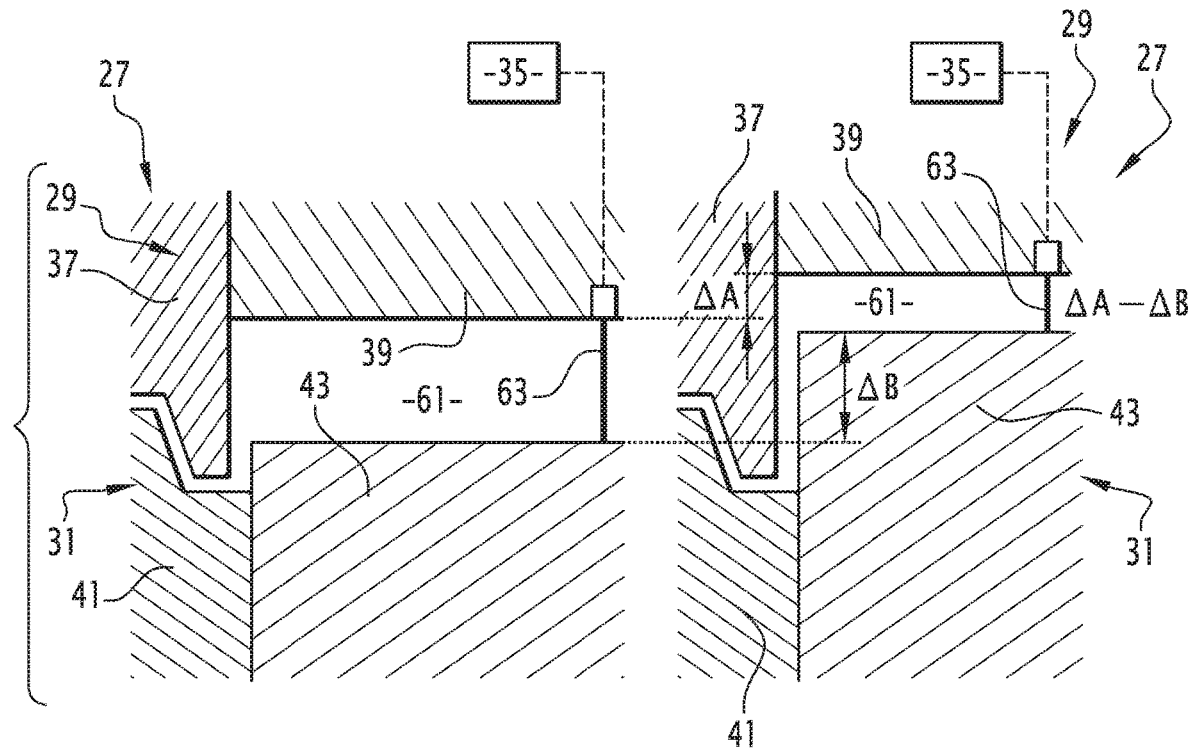
FIG. 3 is a cross section of a part of the mold, on the left in its closed position with the first settings, and on the right in its closed position with the second settings.

When the mold 27 is closed, the front insert 39 occupies a final front position, and the back insert 43 occupies a final back position, the front and back inserts 39, 43 defining a gap 61 between them (FIG. 3).

The device 35 allows adjusting the followings settings of the mold 27: the final front position of the front insert 39 with respect to the front fixed part 37, and the gap 61 between the front and back insert 39, 43. More precisely, the device 35 allows adjusting the height of the gap 61, taken along the main direction.

As will be explained below, the position of the front insert 39 remains unchanged with respect to the front fixed part 37 when the mold 27 closes. In other words, the front fixed part 37 and the front insert 39 are moved as one piece. The device 35 in this case comprises a control device 63, controlling the actuator 47 in order to position the front insert 39 at a selected position with respect to the front fixed part 37.

On the other hand, the mold 27 is arranged such that, when the mold closes by moving the front and back tools 29, 31 toward one another, the central area 15 of the first or second trim part 3, 21 is first pressed by the front insert 39 against the back insert 43, the peripheral area of the first or second trim part 3, 21 being not pressed by the front fixed part 37 against the back fixed part 41 at this stage.

When the front and back tools 29, 31 are further moved toward one another, the back insert 43 is moved with the front insert 39 with respect to the back fixed part 41 along the main direction, until the peripheral area of the first or second trim part 3, 21 is pressed by the front fixed part 37 against the back fixed part 41.

The gap 61 is controlled for example by adjusting the height of a spacer 63, attached to the front or to the back insert 39, 43, and extending between the front and back insert 39, 43 (FIG. 3). The height of the spacer 63 is controlled by the device 35.

The first values of the settings are chosen such that, when the first trim part 3 is inside the mold and when the mold 27 is closed (situation of the FIG. 3, left side), the front insert 39 has a first front final position along the main direction with respect to the front fixed part 37 and the back insert 43 has a first back final position along the main direction with respect to the back fixed part 41.

The second values of the settings are chosen such that, when the second trim part 21 is inside the mold 27 and when the mold 27 is closed, the front insert 39 has a second front final position along the main direction with respect to the front fixed part 37 different from the first front final position, and the back insert 43 has a second back final position along the main direction with respect to the back fixed part 41, different from the first back final position.

To take into account that the first trim part 3 has a non-compressible layer 9 toward the back tool 31 and a compressible layer 11 toward the front tool 29, the second trim part 21 having no compressible layer, the second front final position is shifted away from the back tool 31 along the main direction with respect to the first front final position by a quantity ΔA (FIG. 3), chosen as indicated below.

Figure 4:
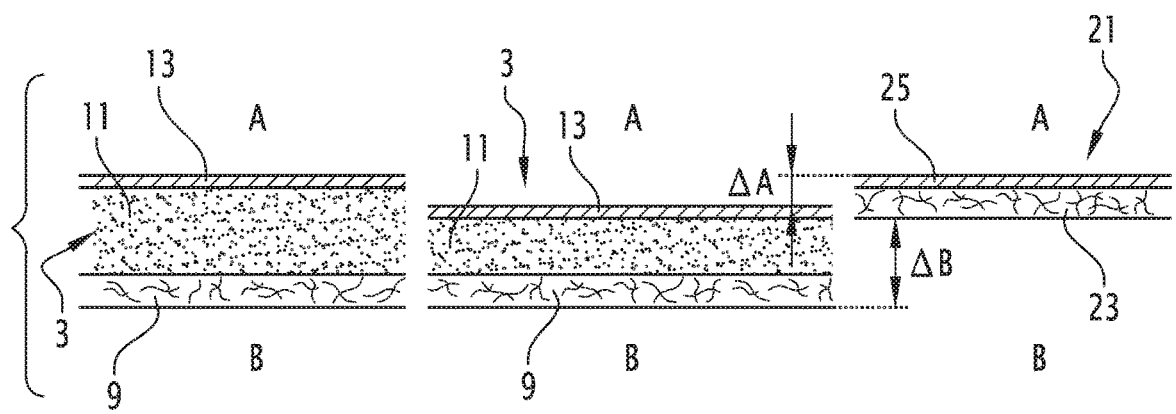
FIG. 4 is a cross section, at a larger scale, on the left of a piece of the first trim part in an expanded state, in the middle of the same piece of the first trim part in a compressed state corresponding to the closed position of the mold, on the right of a piece of the second trim part.
Figure 7:
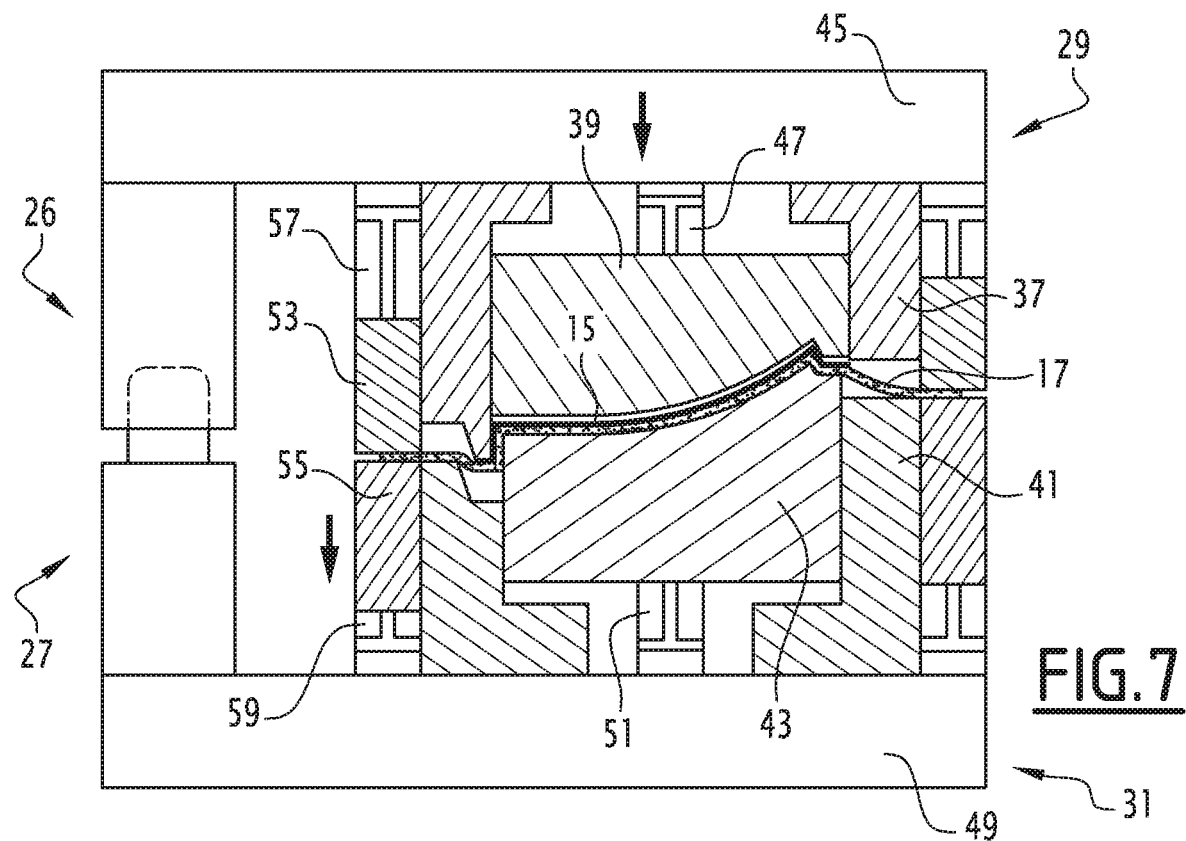
Figure 8:
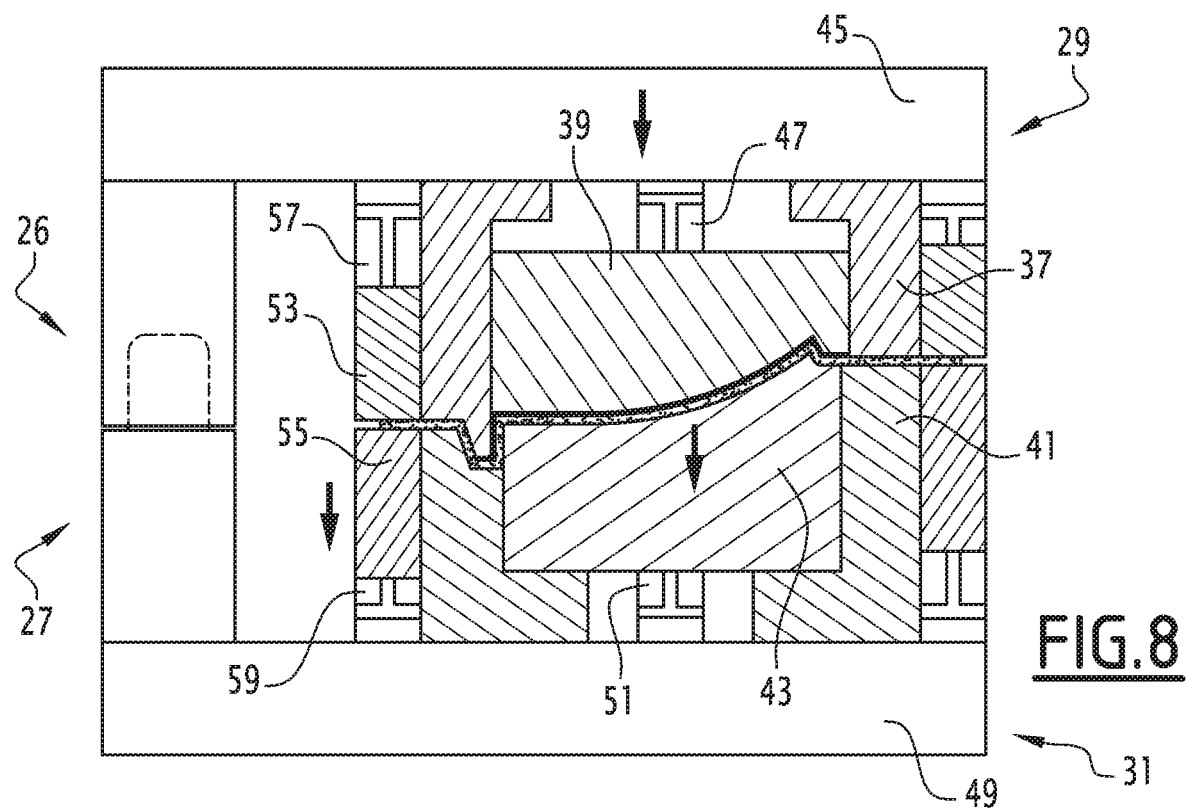

As shown on the FIG. 4, the compressible layer 11 is compressed when the mold 27 is in its closed position. When the first trim part 3 is outside of the mold 27, the compressible layer 11 expands, toward the A-surface. The thickness of the compressible layer 11, and of the central part 15 of the first trim part 3, increases by a quantity Δth. The order of magnitude of Δth is frequently 1 mm. ΔA is chosen substantially equal to Δth.

The surrounding areas 17 of the first and second trim parts 3 and 21 are at the same final position when the mold 27 is closed.

Because of the shift of ΔA in the final position of the front insert, the A-surface of the second trim part 21 is at the same position with respect to the surrounding area 17 as the A-surface of the first trim part 3, after the expansion (FIG. 4).

The second back final position is shifted toward the front tool along the main direction with respect to the first back final position, by a quantity ΔB. The quantity ΔB is chosen according to the following equation:

$$\Delta B - \Delta A = T1 - T2, \text{ where } T2 \text{ is the second thickness and } T1 \text{ is the first thickness.}$$

The non-compressible layers 9, 23 of the first and second inserts 3, 21, as a consequence, have the same physical properties: density, weight per area . . . . This point is especially important when the non-compressible layers 9, 23 are made of NFPP or other similar materials.

The manufacturing process using the assembly above will now be described, with respect to FIGS. 2 and 5 to 8.

The manufacturing process will be described for a case where the first and second trim parts 3, 21 described above have to be produced.

Initially, the forming mold 27 is in its open position, as shown on FIG. 2.

The manufacturing method comprises the following steps:

adjusting settings of the forming mold 27 to the first values;

introducing the first trim part 3 between front and back tools 29, 31 of the forming mold 27;

closing the mold 27, the first values of the settings being chosen such that, when the mold 27 is closed, the front insert 39 has the first front final position along the main direction with respect to the front fixed part 37 and the back insert 43 has the first back final position along the main direction with respect to the back fixed part 41;

opening the mold 27 and removing the formed first trim part 3 from the forming mold 27;

adjusting settings of the forming mold 27 to the second values, different from the first values;

introducing the second trim part 21 between the front and back tools 29, 31 of the forming mold 27;

closing the forming mold 27, the second values of the settings being chosen such that, when the mold 27 is closed, the front insert 39 has the second front final position along the main direction with respect to the front fixed part 37 different from the first front final position, and the back insert 43 has the second back final position along the main direction with respect to the back fixed part 41, different from the first back final position;

opening the mold 27 and removing the formed second trim part 3 from the forming mold 27.

The first trim part 3 is laid down on the back clamping frame 55 by the device 33. The first trim part 3 is initially flat, as shown on the FIG. 5. The first trim part is oriented such that the compressible layer 11 faces the front tool 29, and the non-compressible layer 9 faces the back tool 31.

Then the front and back tools 29, 31 are moved toward one another, for closing the mold. In the example shown on the figures, the front tool 29 is moved along the main direction toward the back tool 31, the back tool being fixed. In other embodiments, the front tool is fixed and the back tool moves along the main direction, or both the front and back tools move along the main direction.

During the travel of the front and back tools 29, 31 toward one another, the front insert 39 remains at the same position with regard to the front fixed part 37. The front insert 39 and the front fixed part 37 are moved as one piece.

The front clamping frame 53 remains at the same position with regard to the front fixed part 37 as well. It is moved as one piece with the front insert 39 and the front fixed part 37.

During a first part of the travel (FIG. 6), the back clamping frame 55 and the back insert 43 remain at the same position with respect to the back fixed part 41.

The first part of the travel ends when the first trim part 3 is clamped between the front and back clamping frame 53, 55.

During a second part of the travel (FIG. 7), the back insert 43 remain at the same position with respect to the back fixed part 41. The back clamping frame 55 moves with the front clamping frame 53 along the main direction, toward the back tool 31. The actuator 59 is passive during the second part of the travel. It is driven by the pressure exerted by the front clamping frame 53 on the back clamping frame 55.

The second part of the travel ends when the central area 15 of the first trim part 3 is pressed between the front and back inserts 39, 43.

During a third part of the travel (FIG. 8), the back insert 43 moves with the front insert 39 with respect to the back fixed part 41 along the main direction toward the back tool 31. The actuator 51 is passive during the third part of the travel. It is driven by the pressure exerted by the front insert 39 on the back insert 43.

The back clamping frame 55 moves along with the front clamping frame 53 along the main direction, toward the back tool 31. The actuator 59 is passive during the third part of the travel. It is driven by the pressure exerted by the front clamping frame 53 on the back clamping frame 55.

The third part of the travel ends when the surrounding area 17 of the first trim part 3 is pressed between the front and back fixed parts 37, 41.

The mold 27 is then opened, and the formed first trim part 3 is removed from the mold, typically using the device 33. The back clamp 55 and the back insert 43 are brought back to their initial position by the actuators 59 and 51, respectively. The front clamping frame 53 is brought back to its initial position by the actuators 57.

Typically, other trim parts, similar to the first trim part 3, are manufactured as described above, before the settings of the mold are changed.

The settings of the forming mold 27 are then adjusted to the second values.

The front insert 39 is moved by mean of the actuator 47 with respect to the front fixed part 37. If necessary, the position of the front clamping frame 53 is adjusted with respect to the front fixed part 37, by mean of the actuator 57.

The height of the spacer 63 is modified.

Then the second trim part 21 is introduced in the forming mold 27, and laid down on the back clamping frame 55 by the device 33. The second trim part 21 is initially flat. The second trim part 21 is oriented such that the decorative layer 25 faces the front tool 29, and the non-compressible layer 23 faces the back tool 31.

The mold is then closed. The travel of the front and back tools 29, 31 toward one another comprises the same first, second and third parts as described above for the first trim part 3.

The illustrated embodiment of the invention has been described for an example in which two trim parts, with different thicknesses, are manufactured. However, the invention in other embodiments encompasses cases where three trim parts, having thicknesses different from one to another, are manufactured, or more than three trim parts. For instance the third trim part do not have a decorative layer. The settings of the mold typically are adjustable such that the front and back final positions are freely selected each in a continuous range.

The terms front and back tools are not used in a limitative way. Typically, the two halves of a mold are placed above one another and are moved vertically, as shown on the figures. However, at least some embodiments of the invention could be implemented with the front and back tool moving along a horizontal direction with respect to one another. The main direction, along which the front and back inserts move with respect to the front and back fixed parts, is horizontal. The front tool is above the back tool in the example depicted on the figures. In another example, the back tool is above the front tool.

The first and second trim parts, in the example described above, respectively have a compressible layer, and do not have a compressible layer. According to another example, the first and second trim parts both have a compressible layer. The first and second front final positions are then chosen taking into account the expansion of the compressible layer of the two trim parts, such that the A-surface of the first and second trim parts are at the same position with respect to the respective surrounding areas of the first and second trim parts.

According to another example, the first and second trim parts both do not have a compressible layer. In this case, the settings adjustment device could adjust the followings settings of the mold: the final front position of the front insert with respect to the front fixed part, and the final back position of the back insert with respect to the back fixed part. In this case, the back insert remain fixed with respect of the back fixed part during all the travel of the front and back tools toward one another.

In the example described above, the non-compressible layer is turned toward the back tool, and the back tool has a back insert which is pushed back by the front insert during the third part of the travel of the front and back tools toward one another. The compressible layer faces the front tool. In another example, the non-compressible layer faces the front tool, and the compressible layer faces the back tool.

The invention claimed is:

1. A method for manufacturing first and second trim parts of a vehicle in a forming mold, the first trim part having a first thickness and the second trim part having a second thickness different from the first thickness, wherein the forming mold includes a front tool and a back tool that are adjustable according to settings, wherein the front tool includes a front fixed part of the forming mold and a front movable insert of the forming mold, the front movable insert of the forming mold being movable with respect to the front fixed part along a main direction, and wherein the back tool includes a back fixed part of the forming mold and a back movable insert of the forming mold, the back movable insert of the forming mold being movable with respect to the back fixed part along the main direction, the method comprising the following steps:

adjusting the settings of the forming mold to first values, wherein the settings include one or more settings selected from: a front final position of the front movable insert of the forming mold along the main direction with respect to the front fixed part, a back final position of the back movable insert of the forming mold along the main direction with respect to the back fixed part, and a size of a gap between the front movable insert of the forming mold and the back movable insert of the forming mold when the forming mold is closed;

introducing the first trim part between the front tool and the back tool of the forming mold;

closing the forming mold, the first values of the settings being chosen such that, when the forming mold is closed, the front movable insert of the forming mold has a first front final position along the main direction with respect to the front fixed part and the back movable insert of the forming mold has a first back final position along the main direction with respect to the back fixed part;

adjusting the settings of the forming mold to second values different from the first values;

introducing the second trim part between the front tool and the back tool of the forming mold;

closing the forming mold, the second values of the settings being chosen such that, when the forming mold is closed, the front movable insert of the forming mold has a second front final position along the main direction with respect to the front fixed part different from the first front final position, and the back movable insert of the forming mold has a second back final position along the main direction with respect to the back fixed part, different from the first back final position.

2. The method according to claim 1, wherein the settings include both of the front final position of the front movable insert of the forming mold along the main direction with respect to the front fixed part and the gap between the front movable insert and the back movable insert when the forming mold is closed.

3. The method according to claim 1, wherein the front and back tools are moved one toward the other when the forming mold closes, the first trim part having a non-compressible layer toward the back tool and a compressible layer toward the front tool, the second trim part having no compressible layer and the second thickness being lower than the first thickness, the second front final position being shifted away from the back tool along the main direction with respect to the first front final position, the second back final position being shifted toward the front tool along the main direction with respect to the first back final position.

4. The method according to claim 1, wherein the front tool defines the A-side of the first and second trim parts.

5. The method according to claim 1, wherein central areas of the first and second trim parts are formed between the front and back movable inserts, and surrounding areas of the first and second trim parts are formed between the front and back fixed parts, the respective surrounding areas of the first and second trim parts surrounding the respective central areas of the first and second trim parts.

6. The method according to claim 5, wherein the step of closing the forming mold comprises the following sub-steps:

moving the front and back tools toward one another, until the central area of the first or second trim part is pressed by the front movable insert against the back movable insert, the surrounding area of the first or second trim part being not pressed by the front fixed part against the back fixed part; and moving the front and back tools further toward one another, the back movable insert being moved with the front movable insert with respect to the back fixed part along the main direction, until the surrounding area of the first or second trim part is pressed by the front fixed part against the back fixed part.

7. The method according to claim 1, wherein the front tool and the back tool move toward each other along the main direction when the forming mold closes.

8. An assembly for manufacturing first and second trim parts of vehicle, the first trim part having a first thickness and the second trim part having a second thickness different from the first thickness, the assembly comprising:
- a forming mold, having front and back tools movable with respect to one another, the front tool having a front fixed part and a front movable insert movable with respect to the front fixed part along a main direction, the back tool having a back fixed part and a back movable insert movable with respect to the back fixed part along the main direction, the forming mold having an open position in which the front and back tools are farther away from one another, and a closed position in which the front and back tools are closer to one another;
- a device for introducing the first or second trim parts between front and back tools of the forming mold in the open position;
- a device adjusting settings of the forming mold selectively to first or second values different from one another, the first values of the settings being chosen such that, when the forming mold is closed, the front insert has a first front final position along the main direction with respect to the front fixed part and the back insert has a first back final position along the main direction with respect to the back fixed part, the second values of the settings being chosen such that, when the forming mold is closed, the front insert has a second front final position along the main direction with respect to the front fixed part different from the first front final position, and the back insert has a second back final position along the main direction with respect to the back fixed part, different from the first back final position.

9. The assembly according to claim 8, wherein the settings comprise the front final position of the front insert along the main direction with respect to the front fixed part, and the gap between the front insert and the back insert when the forming mold is closed.

10. The assembly according to claim 8, wherein the first trim part has a non-compressible layer toward the back tool and a compressible layer toward the front tool, the second trim part having no compressible layer and the second thickness being lower than the first thickness, the second front final position being shifted away from the back tool along the main direction with respect to the first front final position, the second back final position being shifted toward the front tool along the main direction with respect to the first back final position.

11. The assembly according to claim 8, wherein the front tool defines the A-side of the first and second trim parts.

12. The assembly according to claim 8, wherein central areas of the first and second trim parts are formed between the front and back inserts, and peripheral areas of the first and second trim part are formed between the front and back fixed parts, the respective peripheral areas of the first and second trim parts surrounding the respective central areas of the first and second trim parts.

13. The assembly according to claim 12, wherein the forming mold is arranged such that, when the forming mold is closed by moving the front and back tools toward one another:
- the central area of the first or second trim part is first pressed by the front insert against the back insert, the peripheral area of the first or second trim part being not pressed by the front fixed part against the back fixed part; and
- then the back insert is moved with the front insert with respect to the back fixed part along the main direction, until the peripheral area of the first or second trim part is pressed by the front fixed part against the back fixed part.

* * * * *